United States Patent
Masoudi

(10) Patent No.: US 10,369,582 B2
(45) Date of Patent: Aug. 6, 2019

(54) SYSTEM AND METHOD FOR SPRAY VISUALIZATION

(71) Applicant: Mansour Masoudi, Mill Creek, WA (US)

(72) Inventor: Mansour Masoudi, Mill Creek, WA (US)

(73) Assignee: Emissol LLC, Mill Creek Blvd., WA (US)

( * ) Notice: Subject to any disclaimer, the term of this patent is extended or adjusted under 35 U.S.C. 154(b) by 236 days.

(21) Appl. No.: 15/140,732

(22) Filed: Apr. 28, 2016

(65) Prior Publication Data

US 2016/0239954 A1    Aug. 18, 2016

Related U.S. Application Data

(60) Provisional application No. 62/155,292, filed on Apr. 30, 2015.

(51) Int. Cl.
*G01M 9/06* (2006.01)
*B05B 12/08* (2006.01)
*G01M 15/10* (2006.01)

(52) U.S. Cl.
CPC ............ *B05B 12/08* (2013.01); *G01M 9/067* (2013.01); *G01M 15/108* (2013.01); *F01N 2610/02* (2013.01); *F01N 2610/03* (2013.01)

(58) Field of Classification Search
CPC ..... G01M 15/108; G01M 9/067; B05B 12/08; F01N 2610/02; F01N 2610/03

(Continued)

(56) References Cited

U.S. PATENT DOCUMENTS 3,027,754 A   4/1962   Alquist
3,042,567 A   7/1962   King
(Continued)

FOREIGN PATENT DOCUMENTS

CN   200820231326   12/2009
CN      202360271    8/2012
(Continued)

OTHER PUBLICATIONS

Lynn A. Melton, James F. Verdieck Vapor/liquid visualization in fuel sprays vol. 20, Issue 1, 1985, pp. 1283-1290 Twentieth Symposium (International) on Combustion http://www.sciencedirect.com/science/article/pii/S0082078485806184.
(Continued)

*Primary Examiner* — On S Mung
(74) *Attorney, Agent, or Firm* — Reuven K. Mouallem; FlashPoint IP Ltd.

(57) ABSTRACT

A spray visualization apparatus and method are disclosed. Unlike laser or Doppler techniques requiring costly instrumentation, the herein disclosed technique is much simpler. The apparatus comprises a hollow flow tube, an injector device coupled to the hollow flow tube, and at least one membrane surface material substantially positioned crossflow in the hollow flow tube. The method relies on a fluorescent dye marking the spray droplets impinging on the membrane surface material. The image of spray droplets on the membrane reveals the distribution pattern of droplets in the oncoming flow as the droplets impinge on the membrane. A digital scan of the membrane is acquired. The scanned image is quantitatively analyzed for droplet size, amount and uniformity index. The disclosed technique is a low-cost alternative for study and testing spray patterns generated by automobile emissions.

22 Claims, 5 Drawing Sheets

(58) Field of Classification Search
USPC .......................................................... 348/135
See application file for complete search history.

(56) References Cited

U.S. PATENT DOCUMENTS

| | | | |
|---|---|---|---|
| 3,912,655 | A | 10/1975 | Shukla et al. |
| 4,356,801 | A | 11/1982 | Graham |
| 4,357,670 | A | 11/1982 | McFarlane |
| 4,515,896 | A | 5/1985 | Melton |
| 4,614,490 | A | 9/1986 | Kiczek et al. |
| 5,107,701 | A | 4/1992 | Smith |
| 5,603,905 | A | 2/1997 | Bartz et al. |
| 5,673,550 | A | 10/1997 | Few et al. |
| 5,739,432 | A | 4/1998 | Sinha |
| 5,979,226 | A | 11/1999 | Cavestri et al. |
| 6,030,204 | A | 2/2000 | Breen et al. |
| 6,067,790 | A | 5/2000 | Choi et al. |
| 6,256,597 | B1 | 7/2001 | Wang et al. |
| 6,286,376 | B1 | 11/2001 | Davidson et al. |
| 6,314,792 | B1 | 11/2001 | Cain |
| 6,508,112 | B1 | 1/2003 | Verhoeven |
| 6,525,325 | B1 * | 2/2003 | Andrews ............ G01N 15/0205 250/301 |
| 6,540,831 | B1 | 4/2003 | Craine et al. |
| 6,601,776 | B1 | 8/2003 | Oljaca et al. |
| 6,973,199 | B2 | 12/2005 | Farina |
| 6,991,183 | B2 | 1/2006 | Nau et al. |
| 7,565,830 | B2 | 7/2009 | Quest et al. |
| 7,883,026 | B2 | 2/2011 | Micheli |
| 7,926,733 | B2 | 4/2011 | Micheli |
| 7,959,093 | B2 | 6/2011 | Payne |
| 8,448,534 | B2 | 5/2013 | Davidson et al. |
| 8,634,076 | B2 | 1/2014 | McNeil-Watson |
| 8,675,197 | B2 | 3/2014 | Corbett |
| 8,702,942 | B2 | 4/2014 | Corbett et al. |
| 9,010,663 | B2 | 4/2015 | Fenton et al. |
| 9,031,278 | B2 | 5/2015 | Boncyk et al. |
| 9,041,794 | B1 | 5/2015 | Olsson et al. |
| 2008/0264381 | A1 | 10/2008 | Teramoto et al. |
| 2012/0286063 | A1 | 11/2012 | Wang et al. |
| 2013/0091830 | A1 * | 4/2013 | Li ........................ F01N 3/2892 60/295 |
| 2015/0147814 | A1 | 5/2015 | Joensuu et al. |
| 2015/0362421 | A1 | 12/2015 | Lewis et al. |

FOREIGN PATENT DOCUMENTS

| | | |
|---|---|---|
| CN | 203232016 | 10/2013 |
| CN | 104481768 | 4/2015 |
| CN | 103410648 | 6/2015 |
| CN | 104791134 | 7/2015 |
| CN | 104792749 | 7/2015 |
| JP | H05149877 | 6/1993 |
| JP | 2985459 | 11/1999 |
| JP | 2006142808 | 6/2006 |
| KR | 101549149 | 6/2014 |
| KR | 101426484 | 8/2014 |
| KR | 101452896 | 10/2014 |
| KR | 20160022015 | 2/2016 |

OTHER PUBLICATIONS

A. M. Murray and L. A. Melton Fluorescence methods for determination of temperature in fuel sprays OSA Publishing > Applied Optics > vol. 24 > Issue 17 > p. 2783 http://www.ncbi.nlm.nih.gov/pubmed/18223954.

Prathan Srichai, Chinda Chareonphonphanich *, Preechar Karin, Nuwong Chollacoop Spray Visualization of Biodiesel and Diesel in a High Pressure Chamber Advanced Materials Research (vols. 931-932) http://www.scientific.net/AMR.931-932.1043.

K. D. Kihm, D P Terracina and J. A, Caton Spray-tip droplet SMDs of intermittent high-pressure sprays of diesel fuel compared with coal-water slurry sprays http://cat.inist.fr/?aModele=afficheN&cpsidt=3589812.

Michelle Zaller, Robert C. Anderson, and Yolanda R. Hicks and Randy J. Locke Comparison of techniques for non-intrusive fuel drop size measurements in a subscale gas turbine combustor NASA/TM—1999-208909 http://ntrs.nasa.gov/archive/nasa/casi.ntrs.nasa.gov/19990021365.pdf.

Song Peng1,Du Bao-guo2,Long Wu-qiang Atomization and combustion characteristics of diesel multi-piece impinging spray http://en.cnki.com.cn/Article_en/CJFDTOTAL-NRJX201101005.htm.

Arturo De Risi, Raffaella Di Sante, Gianpiero Colangelo Optical Characterization of a Diesel Spray at High Temperature and Pressure http://www.aivela.org/deRisi04.pdf.

Lavision SprayMaster Spray Imaging Systems for Quantitative Spray Analysis www.lavision.de/en/download.php?id=322.

Lavision SprayMaster Advanced Spray Analysis based on Laser Light Sheet Imaging http://www.aparaturabadawcza.eu/wp-content/uploads/2015/04/SprayMaster.pdf.

L. A. Melton ; A. M. Murray ; J. F. Verdieck Laser Fluorescence Measurements for Fuel Sprays http://proceedings.spiedigitallibrary.org/proceeding.aspx?articleid=1242827.

* cited by examiner

Start

61
Attach system to source of fumes, fluid, gas or vapor

62
Inject fluorescent dye marker plus spray mixture into system

63
Capture/Collect sample on membrane

64
Image processing of membrane, digitization and quantification of signals on membrane Repeat with new sample

65

End

SYSTEM AND METHOD FOR SPRAY VISUALIZATION

RELATED APPLICATION DATA

This application claims benefit of Provisional U.S. Application No. 62/155,292 filed Apr. 30, 2015, which is incorporated herein by reference.

FIELD

This application relates in general to spray injection and, in particular, to a system and method for spray visualization and measurement.

BACKGROUND

Spray injectors comprise hardware, including pump, nozzle, control electronics, detectors and so forth, and software that provide calibration, operational control, and other functions. Currently, spray visualization techniques use various techniques, such as laser diffraction, optical imaging and phase Doppler technologies, to detect spray droplet size, speed and/or distribution patterns. These techniques are used in observing and evaluating the performance of the hardware and software utilizing sprays. In the popular laser diffraction technique, for instance, an image of an injected spray pattern through a laser sheet is captured using a high-resolution camera and software is then used to visualize and characterize the injected spray using a predetermined, mathematical algorithm.

There are limitations to these technologies. Most are expensive, complex; require highly-trained users or special measurement set-ups. For instance, in the laser diffraction technique, due to the sensitivity of the laser instruments employed, accurate measurements of spray pattern information requires the set-up of the measurement system to be in a vibration-free environment. In addition, the instruments used are typically expensive and can cost tens of thousands of dollars per set-up. Likewise, operating these devices requires experienced, advanced skills.

Therefore, a need remains for a low cost and relatively simple, versatile approach to visualizing and measuring patterns of injected liquid spray droplets, including for use in closed environments.

SUMMARY

Embodiments of a device and method for spray pattern visualization and characterization are disclosed. This disclosure provides a flexible alternative technique at low cost. The techniques disclosed herein could be used for visualization of gaseous phases, fumes, fluids, vapor, fuel or other liquids such urea-water mixtures, gas-liquid combinations or multi-phases injected in an engine, enclosure or pipe, or any combustion environment.

In one aspect of the disclosure, a method of visualizing a spray of a fluid, comprising steps of injecting a mixture of a hydrocarbon fuel and a fluorescent compound (a fluorophore) into a hollow flow tube having a cross-flow positioned surface material capable of absorbing the fuel and fluorescent compound is disclosed. The injection may be pulsed for a desired duration, or may be continuous. In a further embodiment the method includes collecting flowing droplets on the surface material that is configured to non-attenuate and absorb a flow system comprising the fluorescent compound mixed with the hydrocarbon fuel and an exhaust in the hollow flow tube. The method further comprises removing the surface material following the collecting step and drying the surface material, next observing the droplet markers on surface material using UV light. In still another embodiment, the method includes scanning the surface material for an image of at least one droplet pattern residing on the surface material using an ultraviolet light scanning device, converting the image of at least one droplet pattern into a digitized image of the at least one droplet pattern; and analyzing the digitized image of at least one droplet pattern for droplet size, distribution, uniformity index and/or amount. In a further embodiment, the method includes a hydrocarbon fuel or a synthetic fuel or a bio fuel that includes, but is not limited to, diesel oil, a biodiesel, a petroleum product, petrol, a gasoline and kerosene. In yet another embodiment, the method includes injecting such that injections of the mixture of the hydrocarbon fuel and the fluorescent compound are made in a pulsed mode. In still another embodiment, the method includes injecting such that injections of the mixture of the hydrocarbon fuel and the fluorescent compound are made in a continuous mode.

In a different embodiment, a system for visualizing a spray of fluid comprises a means for injecting a mixture of a hydrocarbon fuel and a compatible fluorescent additive into a hollow flow tube having at least one substantially cross-flow positioned surface material capable of absorbing the fuel and fluorescent additive compound; a means for collecting flowing droplets on the surface material that is configured to non-attenuate a flow and absorb a flow system comprising the fluorescent compound mixed with the hydrocarbon fuel and an exhaust in the hollow flow tube. The system further includes a means for removing the surface material following the collecting step; a means for drying the surface material; a means for observing by naked eye using UV light the surface material for an image of at least one droplet pattern residing on the surface material using an ultraviolet light scanning device; a means for capturing a photographic image for an image of at least one droplet pattern residing on the surface material using an ultraviolet light scanning device; a means for scanning the surface material for an image of at least one droplet pattern residing on the surface material using a scanning device, a means for converting the image of at least one droplet pattern into a digitized image of at least one droplet pattern; and a means for analyzing the digitized image of the at least one droplet pattern for droplet size, uniformity index and amount. Yet another embodiment of the system includes, a camera or a device capable of capturing one or more images of the surface material using ultraviolet or infrared or white light or other spectra thereof.

In embodiment, an apparatus for visualizing a spray of fluid comprises a hollow tube having a first end and a second end, the first end being configured to attach in-line to an automobile exhaust system outlet while the second end includes an opening. An embodiment further includes at least one membrane surface material substantially cross-flow positioned in the hollow tube between the first end and the second end, the membrane surface material further comprises material capable of absorbing and retaining material from the exhaust and a fluorescent compound that has been added to the exhaust. The embodiment includes an injector device functionally coupled to the hollow tube and positioned in between the first end and the second end, the injector device being capable of injecting a mixture of fuel spray and a compatible fluorescent additive compound into the hollow tube. In a further embodiment, the hollow tube is linear and/or curvilinear. The apparatus further comprises a hollow tube that is made from a group of metals including iron, steel, aluminum, copper, zinc, titanium and nickel. The apparatus includes a hollow tube that is made from a group of substances including plastic, polyvinyl, carbon, rubber and glass. Another embodiment includes an apparatus with the membrane surface material made from a group of substances including paper, film, cellulose, nylon, polymer vinyl, and nitrocellulose. The membrane surface material is porous to the flow of gases, exhaust fumes, vapor and the like, yet capable of absorbing or capturing particulates or droplets. There is included in the apparatus at least one membrane surface material, which is positioned using a rigidly placed holder that holds the membrane. Embodiments include at least one membrane that is porous to flow of gas, vapor, fumes and fluids while retaining a particulate material including droplets containing at least one fluorophore or a quencher or a luminescent substance or a colored substance. Additional embodiments include an apparatus having at least one membrane that retains micron scale-size droplets containing at least one fluorophore. Further embodiments include an apparatus having at least one membrane that retains droplets containing at least one fluorophore quencher. In still another embodiment, an apparatus includes an injector device that is configured such that injections can be made in a pulsed mode or a continuous mode. The apparatus is further configured to make injections using urea-water mixtures or paint or AdBlue or diesel exhaust fluid (DEF).

The foregoing summary is not intended to be in any way limiting. In addition to the illustrative aspects, embodiments, further improved aspects, embodiments, and devices and methods will become apparent by reference to the drawings and the detailed description.

BRIEF DESCRIPTION OF THE DRAWINGS

FIG. 5 is an illustrative example of steps in the current disclosure.

A person skilled in the art will recognize that the drawings and accompanying brief descriptions are illustrative without limitations and are not drawn to scale.

Detailed Description

The following disclosure is drawn to a spray visualization methodology. In the following detailed description, reference is made to the accompanying drawings, which form a part and parcel thereof. The illustrative embodiments described in the detailed description, drawings and claims are not meant to be limiting in any way. Other embodiments may be utilized, and other changes may be made, without departing from the spirit, letter or scope of the subject matter presented here.

Figure 1:
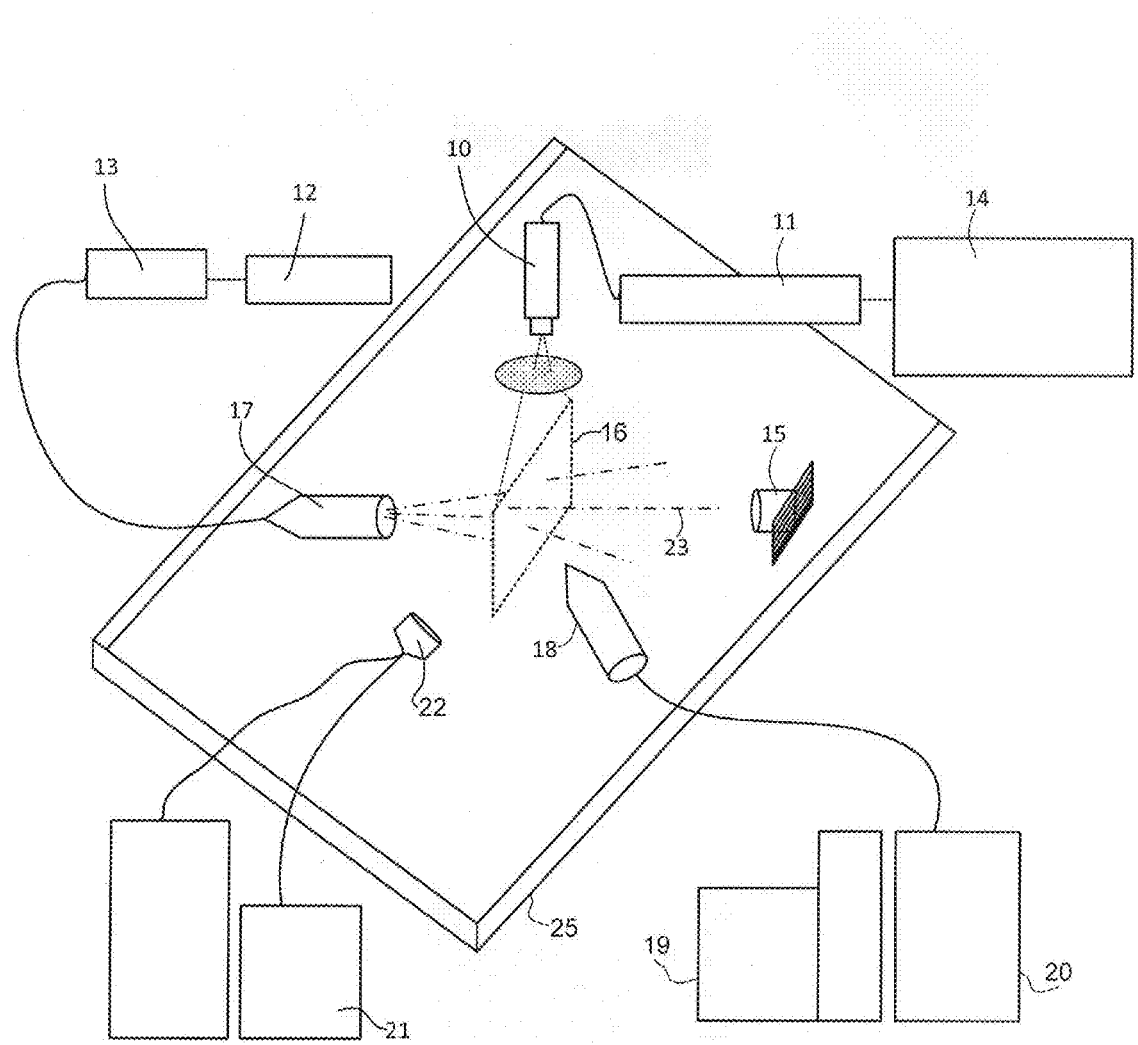
FIG. 1 is a diagrammatic representation of a prior art injector spray visualization technique.

FIG. 1 is an exemplary schematic illustration showing a typical, laser-based prior art experimental set-up for spray visualization, though the same comparison may be made to other, non-laser-based, prior-art systems as well. The instrumentation system includes diode laser systems 10, 11, 12, drivers 13, power supplies 14, high speed video recorder 15 and projected laser beam or sheet 16. Additional equipment includes transmitter 17, receiver 18, data processing and image processing computational hardware 19, 20, and other miscellaneous equipment such as controllers 21 and water supply 22. The principle here is that transmitted light from a laser is diffracted 23 by injected spray droplets and the diffraction patterns yield images of spray and plume distribution patterns. The images of these spray patterns are captured by real-time video recording devices. This laser-based technology additionally requires a vibration-free experimental surface, which is typically achieved by mounting the critical instrumentation such as the lasers and recording devices on an expensive optical table 25. Those skilled in the art will recognize that the current state of the art such as laser-based, while they have some superior data gathering techniques, have the drawbacks of requiring customized measurement set-ups, large initial capital outlay and costly investment in complex equipment, training, skilled personnel and maintenance. Also, they cannot be used in enclosed environment where passage of light through the medium is impossible, difficult or requires destructive customization. The instant disclosure has the distinct advantage of solving the need for expensive capital outlay and simultaneously producing high quality data for spray visualization. The present disclosure requires minimal equipment that is easily manufactured. The herein disclosed method also makes the learning curve much easier for the ordinary technologist because it dispenses with the need for mastery of the often cumbersome and highly sensitive instrumentation needed for a laser-based set up.

Figure 2:
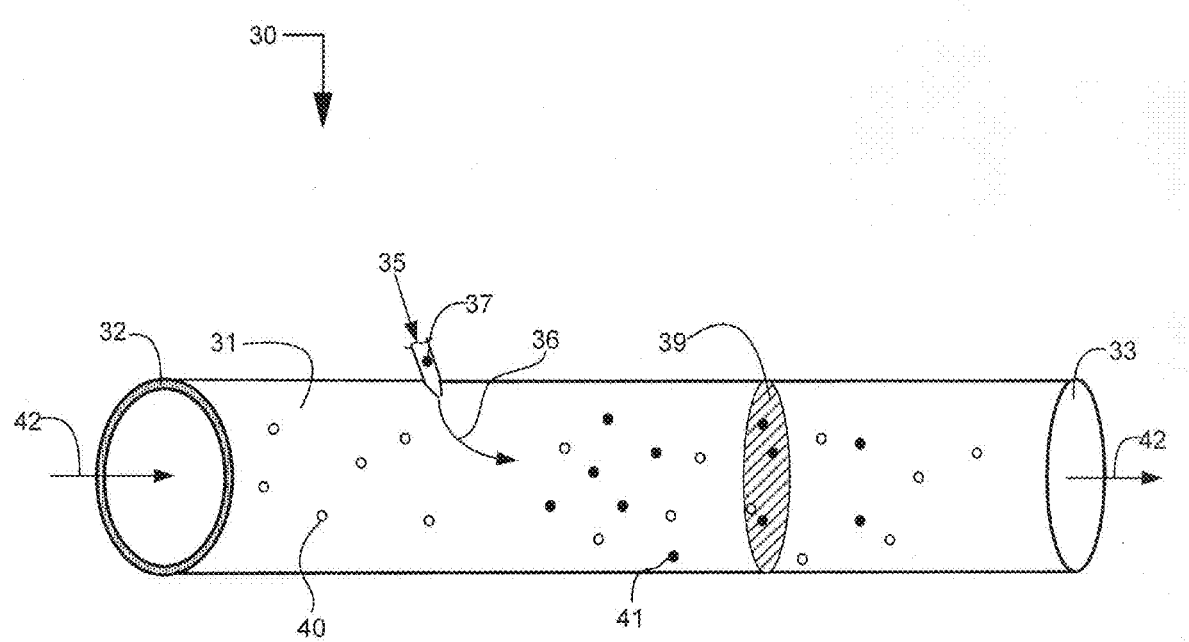
FIG. 2 is an exemplary structure showing injector spray visualization set up in accordance with one embodiment.

Turning now to FIG. 2, which is a schematic illustration of an embodiment 30 of a design for spray visualization. A system for spray visualization comprises a hollow tube 31 having a first end 32 and a second end 33. In an embodiment the tube may be made from any metal or plastic or glass that can operate at any temperature or pressure. In an embodiment, the hollow tube is made from a group of metals including, but not limited to, iron, steel, aluminum, copper, zinc, titanium and nickel. Typically made of steel, the first end 32 is configured to attach to an exhaust pipe of an automobile diesel engine. The first end may be directly attached or may be attached through an intermediate adaptor mechanism. Exhaust fumes or any other suitable form of gaseous mixtures or gas-liquid multi-phases may also be analyzed using this system. The hollow tube includes an injector nozzle 35 that is configured to inject 36 test substances, such as fuel, reductant, dye, additives or a mixture 37 into the hollow tube at high pressures. The injector may be configured to inject other liquid mixtures such as urea-water (AdBlue, DEF or the like). The system may also be adapted for application and analysis of spray paints. The mode of injection may be either pulsed or continuous. A person of skill in the art will recognize that marker dyes substances may include, but are not limited to, colored or luminescent substances, fluorescent dyes, leak detection fluid dyes, and/or any substance that may impart a feature that may be detectable as a marker or indicator for visualization, or substances that are used for marking a test substance such as droplets that travel through the hollow tube. Fluorescent agents suitable for this purpose include fuel-compatible oil-soluble dyes imparting fluorescence to fuel systems, and the like, such as Fluorescent Green Dye H. W., Fluorescent Green Dyes C. H., and Lube Oil Red H. W., and Fluoroleum Red, and fluorescein or resorcinol phthalein. Other fluorescent dyes based on naphthalene, anthracene, phenanthrene are also recognized by those skilled in the art.

Downstream of the injector nozzle is present at least one membrane surface material 39 that is capable of capturing any incoming flow substance droplet 40 and/or is capable of selectively capturing the marker/fluorescent dye-containing droplet 41. The membrane may be positioned cross-sectionally at right angle to the longitudinal axis of the tube 31. Alternatively, the membrane 39 may be positioned anywhere inside the tube 31 in such manner as to not interrupt or attenuate the incoming base flow 42 within the tube. To add rigidity to the membrane, it may be framed in a metal holder. In the alternative, there is present other means for rigidly holding the membrane in a substantially cross-flow position inside the tube. In certain embodiments, the membrane may comprise of, but is not limited to, absorbent or filtration material such as 3M Filtrete™ brand used in household air conditioning and heating units or heat pump furnace filters or other equivalent household or industrial dust filters. Alternatively, the membrane may be made from cellulose, nitrocellulose, nylon, plastic, carbon-based materials, paper, cloth, cotton, polyvinyl, a thin film, film-type, fiber or fibrous material.

In a further embodiment, a study/test of a sample of a diesel fuel or a mixture of urea and water is used. A minute amount of a UV-fluorescent dye compound in the form of a solution is added to the study fuel, which includes, but is not limited to, for example, diesel oil, diesel fuel, biodiesel or a petroleum product or a hydrocarbon fuel. In an exemplary test run the dye solution includes an additive fluorescent dye 41. One skilled in the art will recognize that selection of a dye/indicator should be governed by due diligence knowledge that the fluorescent dye should be compatible with test liquid or gas or particle or particulate system. Care should be taken that addition of a selected dye will not alter the chemical or physical properties of the test fuel, fluid or liquid. A skilled artisan will also recognize that marker dye may include, but is not limited to, fluorophores, non-fluorophores, luminescent analogues and suitable quenchers, colored substances visible to the naked eye, textured substances, or luminescent compounds, or any substance that may have a physico-chemical characteristic. The signal detection method include using ultraviolet light, visible light, infrared, ultrasonic, radiative or nonradiative methods, or other electro-magnetic methods, sonic or physico-chemical detection methods. Those skilled in the art will further recognize that fluorescent dyes include, but are not limited to, commonly known compounds such as naphthalene-based or phenanthrene-based compounds have been disclosed previously (E.g., U.S. Pat. Nos. 4,515,8960 and 3,027,754). When chosen and used properly, the additive should not change the test's fuel's properties such as density, viscosity, surface tension, heat capacity or the like. Some physical properties such as density, viscosity and surface tension affect the atomization of the fuel. A mixture of fuel plus a fluorescent additive is injected into the tube 31 or an engine or combustion chamber or any suitable device, which forms spray droplets, such as upon exiting the injector 35. Flowing spray droplets 41 in the tube 31 are captured or absorbed or adhered by the absorbent membrane 39 or film or other suitable absorbent material positioned downstream of the injection point in the flow path of the spray droplets. A distribution pattern of droplets is formed by the impinging of spray droplets onto the absorbent surface of the membrane. The factors that influence or change the pattern of flow and droplets within will alter the amount and distribution of droplet material deposited on the membrane. These factors include, but are not limited to, flow speed, flow patterns, flow turbulence (if any), flow temperature, distance from injector 36 to membrane 39, droplet size, uniformity index, incoming droplet distribution, rate of flow, injection pressure, injection amount, and the like. In an embodiment, the mean diameter of droplet is about 100 microns and the flow rate is about 451 kg/h and the temperature is 25° C. After the test run is complete, the absorbent membrane is removed and dried and processed as described below.

Figure 3:
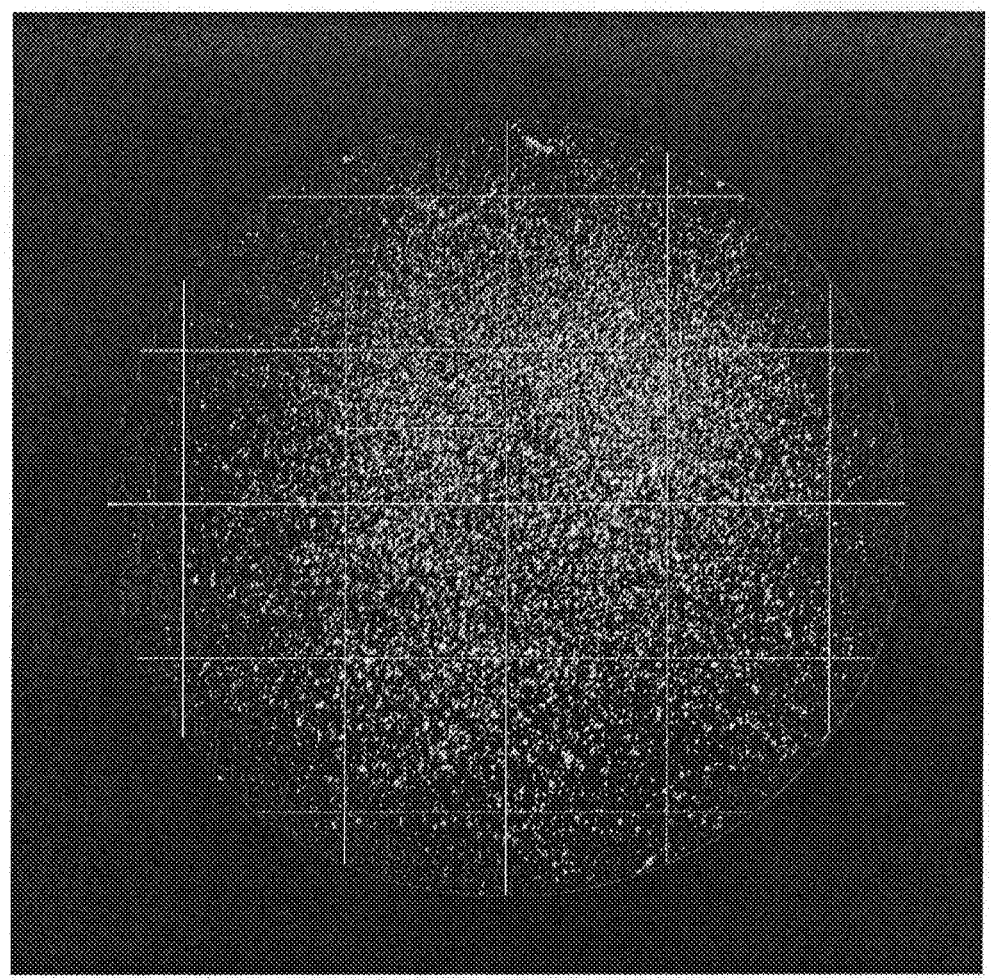
FIG. 3 shows an exemplary image of spray droplets under UV light obtained using the injector spray visualization technique as shown in FIG. 2.

FIG. 3 is an exemplary ultraviolet (UV) light-induced photograph showing spray droplet pattern and distribution under typical flow rate and injector pressure. Each dot in the photograph represents fluorescent signals corresponding to a droplet that impinged on the absorbent membrane. One skilled in the art will recognize that the pattern of imprinted droplet distribution is sensitive to flow injection pressure, which impacts droplet size and inertia, flow speed, temperature, droplet residence time and other parameters. In an embodiment, the mean diameter of droplet is about 100 microns. The distribution uniformity index of the fluorescence signal varies with injector pulse duration of either 3 or 5 seconds at 0.43g/s flow rate and the overall pressure of about 451 kg/h and the temperature is 25° C. A skilled artisan will recognize that a more even and sparse pattern of droplet uniformity index and distribution may be achieved for better signal to noise ratios by varying the flow rate or the total amount of injection into the system. Other parameters may also be varied in this system to achieve good signal to noise ratios.

Figure 4:
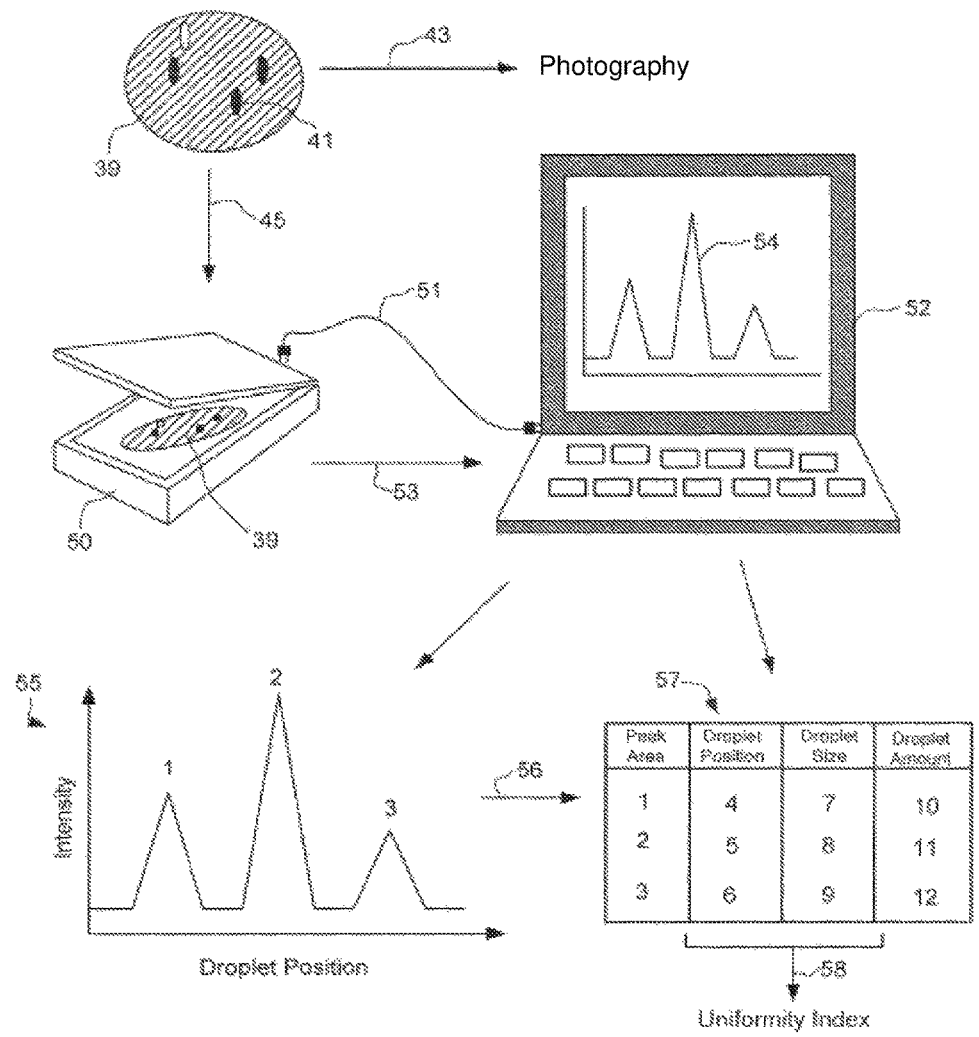
FIG. 4 is an exemplary schema for data processing of membranes following the spray technique disclosed herein.

FIG. 4 is a schema for an embodiment of data processing of a membrane that has been subjected to the protocol outlined in FIGS. 2 and 3. The membrane 39 with the imprint of the droplet signals 41 is observed and photographed using a camera 43, and/or is scanned 45 in a UV scanner imaging system 50 or a compatible imaging spectrometer, or in a digitizing system or in a compatible imaging spectrometer. Those skilled in the art will recognize that image scanners that use fluorescence imaging technology are either commercially available (e.g., Bioreader™ F-Z) or can be customized for the instant purpose. The commercial or customized fluorescence scanners typically can read the imprint patterns generated by the droplets on the membrane surface material 39. The droplet patterns may vary based on the pressure in the injector 35 (FIG. 2), droplet size, other parameters and frequency of impact of the droplets on the membrane surface material dictated by flow rate. The scanning software can construct an image of the droplet patterns. This is usually accomplished through software built into the scanner. The fluorescence scanner is interfaced 51 with a general purpose computer 52. The scanned image is transferred 53 to the computer to be digitized and analyzed by computer programming software specifically capable of transforming an image pattern of the droplets into a graphical 2-D representation 54 (or a 3-D representation) of the image. For instance, each droplet may create an imprint on the membrane that is transformed into a representative peak (e.g., 1, 2, and 3) depending on its fluorescence intensity. An embodiment of a 2-D graphical analysis is shown 55. Here, the droplet position on the membrane is plotted against its peak height, which is directly proportional to fluorescence intensity. This 2-D graphical data may be transformed 56 into a spreadsheet 57 using mathematical algorithms to convert integrated peak areas into droplet location and/or size and/or the droplet uniformity index 58. The goal here is to obtain quantitative data from membrane droplet position using standard reference curves that can be built with known amounts of fluorescent substances in droplets. One skilled in the art will notice that these types of quantitative analyses can be performed using appropriate computer software.

In an embodiment a method of spray visualization is depicted in FIG. 5. The method 60 includes a step 61 of attaching a system that includes a hollow tube to a source of exhaust fumes, fluid, gas or vapor or urea-water mixtures. The source of the exhaust fumes includes, but is not limited to, an automobile, a truck or a combustion engine or a device that emits a gas, vapor or fluid or urea-water mixture, liquid-gas multiphase system. The next step 62 in the method includes injecting a mixture of a hydrocarbon fuel or urea-water and/or a fluorescent or compound or marker dye into a hollow flow tube having a cross-flow positioned surface material capable of absorbing the fuel and fluorescent compound. In an embodiment, the fluorescent compound may include a quencher substance that quenches the fluorescence in order to shift the fluorescence wavelength by exciplex formation. In still another embodiment, the fluorescence may be generated by compounds such as naphthalene, phenanthrene, additives used in leak-detection fluids or other fluorescent compounds. Those skilled in the art will recognize that quenchers may include, but are not limited to, any suitable quencher that is capable of participating in energy-transfer from the selected fluorescent compounds. A further step 63 includes capturing or collecting sample on a membrane surface material. This step 63 includes, but is not limited to, collecting flowing droplets on the surface material that is porous and non-attenuating the flow while simultaneously capable of absorbing a component of a flow system comprising the fluorescent compound mixed with the hydrocarbon fuel (or a urea-water) and an exhaust in the hollow flow tube. In yet another embodiment, as in step 64, the membrane image is processed, digitized and the data from the fluorescence signals is subjected to quantitative analysis. This analysis includes, but is not limited to, using UV scanners (or comparable scanners with other suitable light sources) or digitizers interfaced with computer hardware and software. The entire step of processing, analysis and data collection includes steps of first removing the surface material (membrane) following the collecting step 63, and drying the surface material, scanning the surface material for an image of at least one droplet pattern residing on the surface material using an ultraviolet (UV) light scanning device, converting the image of at least one droplet pattern into a digitized image of the at least one droplet pattern and analyzing the digitized image of the at least one droplet pattern for droplet size, distribution, uniformity index and/or amount. Steps 61-64 in FIG. 5 are repeated with a new sample or study or testing.

The terms surface material, membrane, surface membrane material or surface material membrane or the like are used interchangeably to refer to or connote any porous material comprising a paper, a film, a parchment, a filter, a skin, a mesh, a screen, a netting, interwoven fibers or strands or the like. The term cross-flow is used to mean normal to the direction of base flow carrying the spray. The term uniformity index defines the degree of homogeneity in the droplet distribution on the membrane cross section or at any desired location. The terms urea-water mixture include, but is not limited to, urea and water solutions of any concentration of urea mixed with water and/or any compatible solvent, or solid ammonia, or gaseous ammonia or anahydrous ammonia compounds, ammonia derivatives, ammonium compounds and the like.

EXAMPLE

Most vehicles equipped with diesel engines must employ a diesel particulate filter (DPF) and selective catalytic reduction (SCR) system to comply with exhaust emission standards for diesel soot and nitrogen oxides (NOx), respectively. DPFs significantly reduce diesel exhaust particulate (soot) resulting from diesel fuel combustion. In many diesel vehicles, DPF performance requires in situ injection of fuel spray inside the exhaust stream, which causes the temperature inside the DPF to become sufficiently high to oxidize (i.e., clean) the soot inside the filter; this process is known as DPF regeneration. Likewise, SCR performance requires the injection of urea-water solution (uws) in the form of a spray introduced into the exhaust stream upstream of the SCR. In some SCR systems, gaseous ammonia is injected, instead of uws spray.

Exhaust system design engineers must ensure that appropriate amounts of diesel fuel or uws in the correct spray pattern and distribution are respectively injected inside the exhaust pipe upstream of DPF or SCR. Correct spray injection, dispersion, mixing, evaporation and uniformity index parameters, for instance, are crucial to ensuring successful performance of DPF and SCR, as injecting diesel fuel and uws of a proper amount and in a correct spray pattern will result in an optimal diesel fuel and uws spray distribution upstream of the DPF or SCR, as applicable, respectively for successful DPF regeneration or SCR NOx reduction. Indeed, poor spray distribution of diesel fuel or uws upstream of a DPF or SCR would not only create undesirable performance, but may possibly result in DPF or SCR failure, including DPF melting or underperformance during regeneration due to non-uniform distribution of fuel spray injected upstream, or SCR underperformance or failure due to non-uniform uws spray distribution or urea deposit formation upstream of the SCR. Hence, proper engineering and integration of a fuel spray injector (for DPF regeneration) and of an uws spray injector (for NOx reduction in SCR) is imperative to assure successful and optimal performance of the DPF and the SCR system in diesel exhaust systems.

Design engineers must analyze and assure proper, uniform spray distribution of diesel fuel or uws respectively upstream of the DPF or the SCR via in situ measurements. Prior art light-based techniques, such as laser light, spectroscopy or phase Doppler techniques, cannot penetrate steel exhaust pipes, nor can they be used near vibration-prone combustion engine systems; hence, laser sheet-based techniques are impracticable for investigating spray injection and distribution inside exhaust assembles. By contrast, the herein disclosed technique can be employed to evaluate whether in-exhaust diesel fuel or uws spray injection parameters, such as spray droplet size and distribution, fit optimized performance requirements of DPF or SCR. In this example, a dye solution is added to the diesel fuel or uws prior to its injection. Preferably, a fluorescent dye visible under a black light or ultraviolet light is used, although other dyes visible under white light, room light or other lights could also be employed. A short injection pulse of the mixed liquid is injected into the engine exhaust upstream of the DPF or SCR. An absorbent, yet non-restrictive membrane surface material, such as the material in filters used in air conditioning system, suitable to capture micron scale-size particulates. Such filters allow the diesel exhaust to flow through unimpeded, yet they enable deposition of droplets of the fluorescent dye. The membrane is removed following testing and an image is observed and photographed by a camera, or is scanned in a UV scanner imaging system or a compatible imaging spectrometer, or in a digitizing system or in a compatible imaging spectrometer. Black, ultraviolet, or visible or other types of light, as appropriate, is used in the process. The digital image is then uploaded to a computer where image processing software can evaluate the size and dispersion pattern of the injected liquid spray.

General Comments

The foregoing technique does not require expensive optical tables, laser instruments, producing laser beams or sheets, or involve the complexities in using such instruments and materials. The instrumentation set-up is relatively simple and, unlike laser set-ups, is resilient to vibrations in the testing environment. The set-up is ideal for taking measurements where a quiescent environment may not be possible, such as fuel injection in or near a combustion engine, turbine, or exhaust emission systems, for instance in situ in a diesel exhaust system, where fuel or urea sprays are often injected for emission reduction purposes. The instant disclosure may be adapted to other systems, for instance, inside opaque pipes or other enclosures, typically inaccessible by laser sheet techniques. The full set-up is low cost and can be operated by a layman or unskilled personnel with modest training.

The foregoing spray visualization technique offers several key advantages over prior art:
1. Laser sheet forming instruments are not required. A substantial simplification of the overall droplet measurement cost.
2. High speed cameras are not required in the current method. This leads to further cost reduction.
3. Using laser techniques requires advanced skills. The foregoing technique is simpler and the droplet spray measurements could be performed with low or modest training.
4. The disclosed methodology is versatile and can be applied to other systems and assembly. Vibration and similar disturbances render the laser-based technology very expensive to maintain since optical tables are required for mounting the equipment. The technique disclosed herein however could be used in any conventional room, with or without background vibration. Hence, the instant technique is ideal for in-situ characterization of exhaust fumes from commonly used automobiles, trucks, marine platforms or the like. Other applications of the current methodology includes, but is not limited to, spray injection investigations near engines, exhaust pipes and assemblies, or other tightly enclosed environments. The disclosed methodology and technique may be adopted with minimal redesign and modifications for testing any new exhaust assembly because the absorbent surface material could be positioned at any desired location in an extended or contracted spray path, in opaque or transparent pipes or other enclosures, as any situation may require.
5. Laser sheet/beam techniques require advanced data processing hardware and software because the data are acquired through real-time measurements using high speed video recording devices. That is not the case with the current disclosure technique because the data are acquired on a static membrane surface material throughout the brief injection cycle. Static images of the membrane are less prone to the variables inherent in dynamic sensitivity of real-time technology. Static data can be repeatedly processed without re-running the entire methodology. Here, the membrane surface material is a permanent record of a given sample test run and the images thereof can be scanned and re-scanned for further processing as required.

Some of the advantages of the present technique are summarized in the following table.

| Attribute | Prior Art Teaching | Present Disclosure |
|---|---|---|
| Requires advanced skills | Yes | No |
| Requires laser or other specialized lighting instruments | Yes | No |
| Requires high-speed camera | Yes | No |
| Requires vibration-free measurement environment | Yes | No |
| Usable in opaque medium | No | yes |
| Portable | No | Yes |
| Cost outlay | High | Low |

The foregoing detailed description has set forth various embodiments of devices or methods via the use of examples and drawings. In so far as such drawings and examples comprise one or more devices, steps or methods, it will be understood by those skilled in the art that each component or device or method or step within such drawing and example can be implemented, individually and/or collectively, by a wide range of any combination thereof. One skilled in the art will recognize that the herein described methods, protocols or devices or steps and objects and the discussion accompanying them are used as examples for the sake of conceptual clarity and that various methods, modifications are within the skill of those in the art. Consequently, as used herein, the specific examples or embodiments set forth and the accompanying comments and observations are intended to be representative of their more general classes. In general, use of any specific exemplar or embodiment herein is also intended to be representative of its class, and the non-inclusion of such specific steps, examples, embodiments or drawings and examples or the like herein shall not be taken as indicating that limitation is desired. The herein described subject matter sometimes illustrates different devices or methods comprised within, or associated with, different or other device(s) or methods. It is to be understood that such described device or methods, drawings and examples are merely exemplary, and that in fact many other drawings, and examples can be implemented, which achieve the same or similar results. In a conceptual sense, any device or method or protocol to achieve the same result is effectively "equivalent" to this disclosure such that the desired result is achieved. Hence, any two or more devices or methods or steps herein combined to achieve a particular result can be seen as "equivalent" to each other such that the desired result is achieved, irrespective of differences in method(s) or steps. Likewise, any two device(s) so equivalent can also be viewed as being "functionally "equivalent", to each other to achieve a desired result, and any two methods or devices capable of being so associated can also be viewed as being capable of acting together, with each other to achieve a desired result.

With respect to the use of substantially any plural and/or singular terms herein, those having skill in the art can transmute from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the embodiments herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" or "has" should be interpreted as "having or has at least," the term "includes" should be interpreted as "includes but is not limited to," etc.). For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions comprising only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

I claim:

1. A method of visualizing a spray, the method comprising steps of:
    (a) spraying a mixture of a spray and a fluorescent compound, to form a spray flow, into a hollow flow tube having at least one surface material adapted to absorb said spray and said fluorescent compound, wherein said at least one surface material is substantially positioned in a cross-flow orientation, relative to a base flow, inside said hollow flow tube;
    (b) collecting flow droplets and/or particles on said at least one surface material, wherein said at least one surface material is configured to non-attenuate, and be porous to, said spray flow and said base flow, wherein said at least one surface material is adapted to absorb at least one flow component including said fluorescent compound, mixed with said spray flow and said base flow, within said hollow flow tube;
    (c) imaging said at least one surface material for an image of at least one spray pattern residing on said at least one surface material using an imaging device; and
    (d) analyzing said image of said at least one spray pattern for at least one spray property selected from the group consisting of: a size, a position, an amount, and a flow uniformity index.

2. The method of claim 1, wherein said spray includes at least one fuel selected from the group consisting of: a diesel oil, a biodiesel, a urea-water mixture, a petroleum product, a petrol, a reductant, an oxidant, a gasoline, and a kerosene.

3. The method of claim 1, wherein said step of spraying of said mixture of said spray said fluorescent compound is operable in a pulsed mode.

4. The method of claim 1, wherein said step of spraying of a mixture of urea and water and said fluorescent compound is operable in a pulsed mode.

5. The method of claim 1, wherein said step of spraying includes spraying at least one substance selected from the group consisting of: a gaseous ammonia, an ammonia precursor, an ammonium compound, a reductant, an oxidant, a liquid, a mixture, and said fluorescent compound.

6. The method of claim 1, wherein said step of spraying of said mixture of said spray and said fluorescent compound is operable in a continuous mode.

7. The method of claim 1, wherein said step of spraying of a mixture of urea and water and said fluorescent compound is operable in a continuous mode.

8. The method of claim 1, wherein said step of analyzing said image includes computing said flow uniformity index based on said position and said size.

9. A system for visualizing a spray, the system comprising:
    (a) a hollow flow tube adapted to form a spray flow within said hollow flow tube from a spray device spraying a mixture of a spray and a fluorescent compound into said hollow flow tube;
    (b) a cross-flow, in-line collection component configured for:
        (i) housing at least one surface material adapted to absorb said spray and said fluorescent compound, wherein said at least one surface material is adapted to be substantially positioned in a cross-flow orientation, relative to a base flow, inside said hollow flow tube;
        (ii) collecting flow droplets and/or particles on said at least one surface material, wherein said at least one surface material is configured to non-attenuate, and be porous to, said spray flow and said base flow, wherein said at least one surface material is adapted to absorb at least one flow component including said fluorescent compound, mixed with said spray flow and said base flow, within said hollow flow tube; and
        (iii) holding said at least one surface material in said cross-flow orientation during said collecting of said flow droplets and/or particles on said at least one surface material;
    (c) an imaging device for imaging said at least one surface material for an image of at least one spray pattern residing on said at least one surface material; and
    (d) an image-analysis processor for analyzing said image of said at least one spray pattern for at least one spray property selected from the group consisting of: a size, a position, an amount, and a flow uniformity index.

10. An apparatus for visualizing a spray, the apparatus comprising:
   (a) a hollow flow tube having a first end and a second end, wherein said first end is configured to attach in-line to flow outlet having a base flow, and wherein said second end includes an opening, said hollow flow tube configured to be coupled to a spray device positioned downstream to said first end of said hollow flow tube, wherein said spray device is adapted to spray a mixture of a spray and a fluorescent compound, to form a spray flow, into said hollow flow tube; and
   (b) at least one surface material substantially positioned in a cross-flow orientation, relative to said base flow, inside said hollow flow tube, said at least one surface material being further positioned between said first end and said second end of said hollow flow tube positioned downstream of said spray flow, said at least one surface material configured to non-attenuate, and be porous to, said spray flow and said base flow, said at least one surface material adapted to absorb and retain at least one flow component including said fluorescent compound, mixed with said spray flow and said base flow, within said hollow flow tube.

11. The apparatus of claim 10, wherein said hollow flow tube is attached in-line to an exhaust system of a combustion engine.

12. The apparatus of claim 10, wherein said hollow flow tube is made from a group of metals including at least one metal selected from the group consisting of: iron, steel, aluminum, copper, zinc, titanium, and nickel.

13. The apparatus of claim 10, wherein said hollow flow tube is made from a group of substances including at least one substance selected from the group consisting of: plastic, polyvinyl, carbon, rubber, glass, and opaque material.

14. The apparatus of claim 10, wherein said at least one surface material is made from a group of substances including at least one substance selected from the group consisting of: a paper, a film, a fibrous material, a cellulose, a nylon, a polymer, a vinyl, and a nitrocellulose.

15. The apparatus of claim 10, wherein said at least one surface material is firmly held inside said hollow flow tube using a holder for holding said at least one surface material in said substantially cross-flow orientation.

16. The apparatus of claim 10, wherein said at least one surface material is porous to flow of gas, vapor, fumes, particles, and fluids while retaining a particulate material having micron or sub-micron scale-sized droplets, particles, or aerosols, wherein said micron or sub-micron scale-sized droplets and/or particles, include at least one fluorescent compound adapted to be compatible with a hydrocarbon fuel and a urea-water mixture.

17. The apparatus of claim 10, wherein said at least one surface material is adapted to retain droplets and/or particles containing at least one fluorescent compound.

18. The apparatus of claim 10, wherein said at least one surface material is adapted to retain droplets and/or particles containing at least one fluorescent compound quencher.

19. The apparatus of claim 10, wherein said at least one surface material is adapted to retain droplets and/or particles containing at least one particulate material or at least one particle.

20. The apparatus of claim 10, wherein said spray device is configured to be operable in a pulsed mode.

21. The apparatus of claim 10, wherein said spray device is configured to be operable in a continuous mode.

22. The apparatus of claim 10, wherein the apparatus is portable.

* * * * *